United States Patent [19]

Ishikura

[11] Patent Number: 5,364,239
[45] Date of Patent: Nov. 15, 1994

[54] TERMINAL STRUCTURE FOR MOTOR-DRIVEN PUMP

[75] Inventor: Kazuo Ishikura, Tokyo, Japan

[73] Assignee: Nikkiso Co., Ltd., Tokyo, Japan

[21] Appl. No.: 106,794

[22] Filed: Aug. 16, 1993

Related U.S. Application Data

[63] Continuation of Ser. No. 20,123, Feb. 19, 1993, abandoned.

[51] Int. Cl.$^5$ .............................................. F04B 17/00
[52] U.S. Cl. .............................. 417/423.3; 417/423.7
[58] Field of Search ....................... 417/423.7, 423.3; 310/71

[56] References Cited

U.S. PATENT DOCUMENTS 5,100,298  3/1992  Shibata et al. ................ 417/423.7

FOREIGN PATENT DOCUMENTS 19096    3/1989  Japan .
1177493  7/1989  Japan ................ 417/423.3
237259  10/1990  Japan .

*Primary Examiner*—Richard A. Bertsch
*Assistant Examiner*—Alfred Basichas
*Attorney, Agent, or Firm*—Browdy and Neimark

[57] ABSTRACT

A terminal structure (9) for a motor-driven pump (1) to be disposed in a storage tank for a liquid such as liquefied ammonia or the like interconnects a motor-side terminal element (30) of a first conductor cable (29) for supplying an electric power to a motor (12) of the motor-driven pump and a power source-side terminal element (36) of a second conductor cable (35) for supplying the electric power from an electric power source. The terminal structure (9) has a hollow tubular housing (25) accommodating a conductor (41) and having upper and lower ends (37, 31) through which the power source-side and motor-side terminal elements (36, 30) extend into the housing and are electrically connected to the conductor (41) therein. The motor-side terminal element (30) is sealingly connected to the lower housing end (31) by a sealing mechanism (28, 28A) which utilizes sealing ring (33A, 33B; 133A, 133B) of a metal while the power source-side terminal element (36) is sealingly connected to the upper housing end (37) by a sealing mechanism (27) which utilizes gaskets (26A-26C).

6 Claims, 7 Drawing Sheets

TERMINAL STRUCTURE FOR MOTOR-DRIVEN PUMP

This application is a continuation of application Ser. No. 08/020,123 filed Feb. 19, 1993, now abandoned.

BACKGROUND OF THE INVENTION

1. Field of the Invention

The present invention relates to a terminal structure for a motor-driven pump and, more particularly, to a hermetic terminal structure suitable for use with a motor-driven pump such as a removable type canned motor pump.

2. Description of the Prior Art

The pump for sucking and discharging combustible and dangerous liquids, such as liquefied gas, liquefied ammonia or the like, is of a removable type; i.e., the pump itself is disposed in a tank containing the liquid in order to prevent a leakage of the liquid and is capable of pumping the liquid through a column pipe.

The removable type pump is normally used with a submerged motor. In the case where the liquid to be pumped is of the nature that corrodes copper, the motor used to drive the pump is canned so as to protect copper wires against the corrosive liquid. The pump and the motor are united into a unitary structure which is normally called "canned motor pump".

The canned motor pump has a terminal which interconnects a motor-side conductor cable extending from the motor of the motor pump unit and a power source-side conductor cable extending from an electric power supply source disposed outside a liquid storage tank. The terminal is usually installed on a casing of the canned motor pump. Because the canned motor pump is submerged in the liquid, the terminal is also submerged in the liquid.

The terminal is therefore required to be of a gas-tight structure which seals the interior of the terminal against the corrosive liquid such as liquefied ammonia. For this purpose, gaskets are conventionally employed in the terminal. In addition, the terminal element of the power source-side conductor cable, which is disposed in the terminal structure, is made of aluminium or stainless steel which is not readily corroded by the liquefied ammonia or the like.

A critical part of the conventional terminal structure which utilizes gaskets will be described with reference to FIG. 7 of the drawings.

A terminal 50 shown in FIG. 7 has terminal elements 52 and 54 respectively secured to an end of a power source-side conductor cable 51 and to an end of a motor-side conductor cable 53. The terminal 50 also has a terminal pin 55 of copper having opposite ends connected to the terminal elements 52 and 54 by bolts or screws. The terminal pin 55 extends through a through-hole in a terminal plate 56 of a stainless steel with an electrically insulating sleeve 57 interposed therebetween and with gaskets 63a and 63b interposed between the terminal pin 55 and the sleeve 57 and between the sleeve 57 and the terminal plate 56, respectively.

An upper pipe 58 has a flange 58a disposed in abutment engagement with the upper surface of the terminal plate 56. A lower pipe 59 has a flange 59a which is urged against the terminal plate 56 with a gasket 60 interposed therebetween. The two flanges 58a and 59a are clamped by bolts 61 (only one of which is shown) to sealingly encase the terminal pin 55.

The inner spaces in the upper and lower pipes 58 and 59 are filled with a filling material such as epoxy resin which seals the terminal elements 52 and 54.

However, the gaskets 63a and 63b used in the terminal 50 fall short of providing a satisfactory seal. The corrosive liquid such as liquefied ammonia discharged under a high pressure from the canned motor pump passes through a fine gap between, for example, the terminal plate 56 and the flange 58a and then through gaps between the insulating member 57, the gaskets 63a and 63b and other members until the high pressure corrosive liquid reaches the terminal pin 55 to corrode the same. If the terminal 50 is left un-repaired, the liquefied ammonia enters the motor section of the canned motor pump, with a result that the motor section is damaged due to corrosion by the high pressure liquefied ammonia.

On the other hand, Japanese Utility Model Publication No. 1-9096 published Mar. 13, 1989 discloses a gas-tight terminal structure for a canned motor pump for use in a tank containing a liquid, such as liquefied natural gas or liquefied propane gas, which, unlike liquefied ammonia, does not cause corrosion of copper.

The gas-tight terminal structure disclosed in the Japanese publication referred to above has a terminal base provided on a casing of a motor pump unit and having formed therein a through-hole through which extends a ceramic terminal element which supports a copper conductor extending therethrough. Metal rings are interposed respectively between the ceramic terminal element and the terminal base and between the ceramic terminal element and the copper conductor and are secured respectively to the pair of the ceramic terminal element and the terminal base and to the pair of ceramic terminal element and the copper conductor by soldering or welding. The terminal structure of the above-described gas-tight structure is disposed in a housing mounted on the casing of the canned motor pump.

The gas-tight terminal structure disclosed in the Japanese publication referred to above can provide a extremely high gas-tightness because the pair of ceramic terminal element and the conductor and the pair of ceramic terminal element and the terminal base are sealingly connected together by welding or soldering.

However, the gas-tight terminal structure disclosed in the Japanese publication referred to above cannot be directly applied to a canned motor pump which is operated to deal with a corrosive liquid such as liquefied ammonia which shows a high corrosive nature relative to copper.

This is because, while the gas-tight terminal structure itself has a high gas-tightness, the copper conductor is corroded by the corrosive liquid which invades into the housing which accommodates the gas-tight terminal structure, so that the gas-tightness of the terminal structure damaged.

However, the conductor in the gas-tight terminal structure cannot be easily replaced by a metal such as aluminium which is corrosion-resistant to liquefied ammonia because no technique has ever been developed for easily securing a metal ring to a conductor metal such as aluminium by soldering or welding.

Accordingly, the gas-tight terminal structure disclosed in the Japanese publication referred to above cannot be applied to a terminal box structure for a canned motor pump to be submerged in a corrosive liquid such as liquefied ammonia, with a result that there is no way other than relying on gaskets so as to achieve the required gas-tightness of the terminal structure. However, the use of gaskets in the terminal structure can provide a gas-tightness to only a limited extent, as pointed out above, which disadvantageously induces an occurrence of damage in the pump.

SUMMARY OF THE INVENTION

It is an object of the present invention to provide a terminal structure for a motor-driven pump which has a gas-tightness sufficiently high enough to prevent the entrance of a liquid having high corrosion characteristics relative to copper, such as liquefied ammonia.

In order to achieve the above object, the present invention provides a terminal structure for installation on a casing of a motor-driven pump to be disposed in a storage tank for a liquid such as liquefied ammonia or the like, the terminal structure being designed to interconnect a first conductor cable for supplying electric power to a motor of the motor-driven pump and a second conductor cable for supplying the electric power from an electric power source, the terminal structure comprising:

a housing comprising a lower base disposed on the casing, a hollow tubular member having a first open end hermetically closed by the lower base and an upper closure member hermetically closing a second open end of the tubular member;

a motor-side terminal element adapted to be electrically connected to the first conductor cable and extending through a first through-hole in the lower base and connected thereto hermetically by molten metal sealing and in an electrically insulated manner;

a power source-side terminal element adapted to be electrically connected to the end of said second conductor cable remote from the power source, the power source-side terminal element extending through a second through-hole in the upper closure member and connected thereto through gaskets and in a hermetic and an electrically insulated manner, the power source-side terminal element being made of a metal having a corrosion-resistant characteristic relative to liquefied ammonia or the like; and a conductor member disposed in the housing and electrically interconnecting the motor-side terminal element and the power source-side terminal element.

In a preferred embodiment of the terminal box structure according to the present invention, the motor-side terminal is sealingly connected to the lower base by molten metal, while the power source-side terminal of a corrosion-resistant metal is sealed to the upper closure member by a gasket, whereby a double seal structure is provided for the terminal box structure to advantageously prevent the corrosive liquid from entering the housing.

DESCRIPTION OF THE PREFERRED EMBODIMENTS

A preferred embodiment of the present invention will be described hereinunder.

Figure 6:
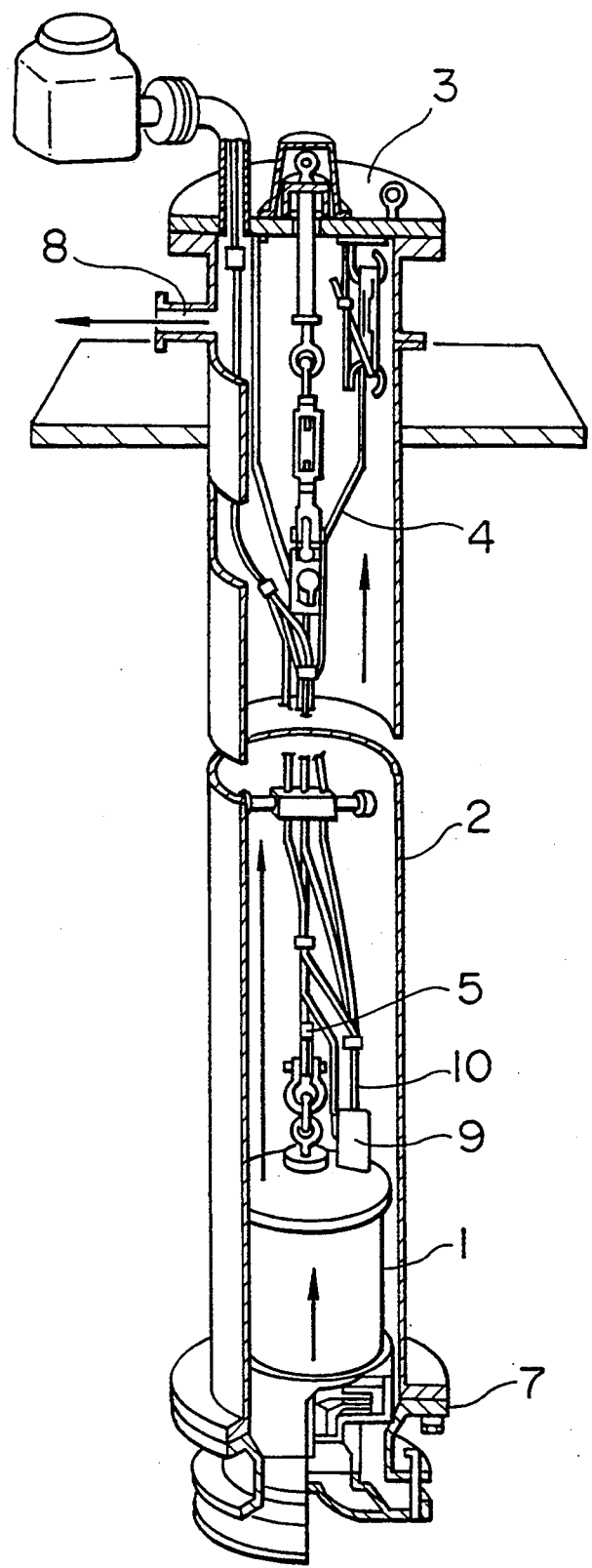
FIG. 6 shows in perspective view of the canned motor pump when installed in position.
Figure 7:
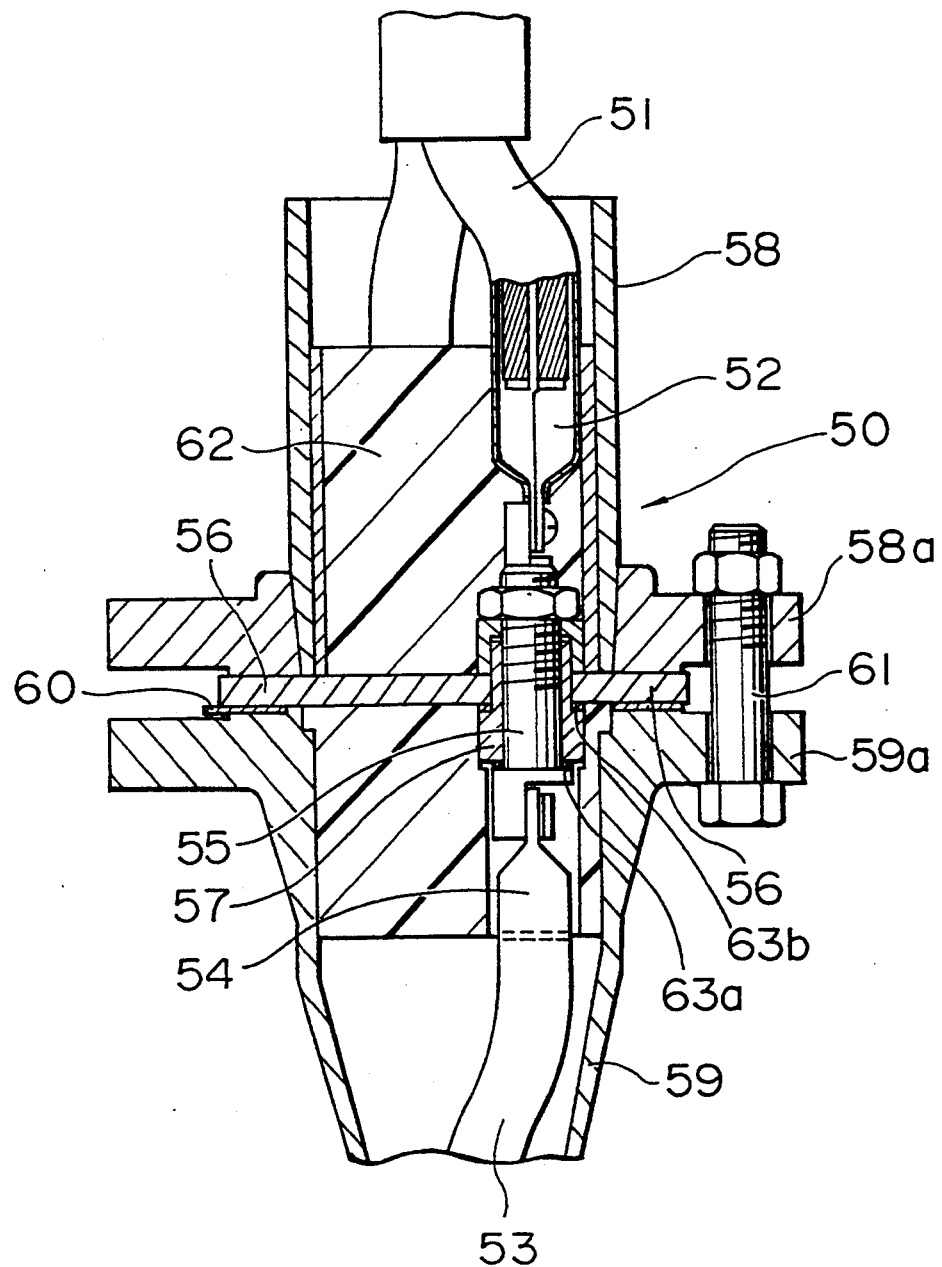
FIG. 7 is an enlarged sectional view of the terminal structure of the prior ark.

Referring first to FIG. 6, a description will be made of a manner in which a canned motor pump 1, which is a motor-driven pump, is installed.

The canned motor pump 1 is disposed at the bottom of a column pipe 2 installed in a tank containing a liquid, such as liquefied ammonia, which has corrosive characteristics relative to copper. The canned motor pump 1 is suspended by a lift cable 4 extending downwardly from a head plate 3 provided at the top of the column pipe 2 and by a suspension member 5 supported by the lift cable 4.

The canned motor pump 1 can be lifted away from the bottom of the column pipe 2 by winding up the lift cable 4 by, for example, a winch (not shown) after the head plate 3 has been removed. The pump can be lowered to and installed at the bottom of the column pipe 2 by feeding the lift cable 4 downwardly from the winch.

A foot valve 6 and a foot valve adapter 7 are provided at the lower end extremity of the column pipe 2. The foot valve 6 is mounted on the foot valve adapter 7 such that the foot valve 6 is always biased by coil springs (not shown) toward the foot valve adapter 7. In other words, when the canned motor pump 1 is lifted away from the bottom of the column pipe 2, the foot valve 6 is urged by the coil springs into engagement with the foot valve adapter 7 so that the open bottom end of the column pipe 2 is closed. When the suspended canned motor pump 1 is lowered to the bottom of the column pipe 2 and engaged with the foot valve 6, the weight of the canned motor pump 1 moves the foot valve 6 downwardly against the forces of the coil springs to a position in which a clearance is formed between the foot valve 6 and the foot valve adapter 7. The liquid in the tank is thus allowed to flow into the column pipe 2.

The canned motor pump 1 is electrically connected to an electric power supply source (not shown) by an electric supply line which includes a conductor cable 10 extending through an opening in the head plate 3 into the column pipe 2 and having a terminal which is disposed in a terminal structure 9 on the canned motor pump 1 and is electrically connected in the terminal structure 9 to a terminal of a motor-side conductor cable extending from a motor section 12 of the canned motor pump 1.

Figure 1:
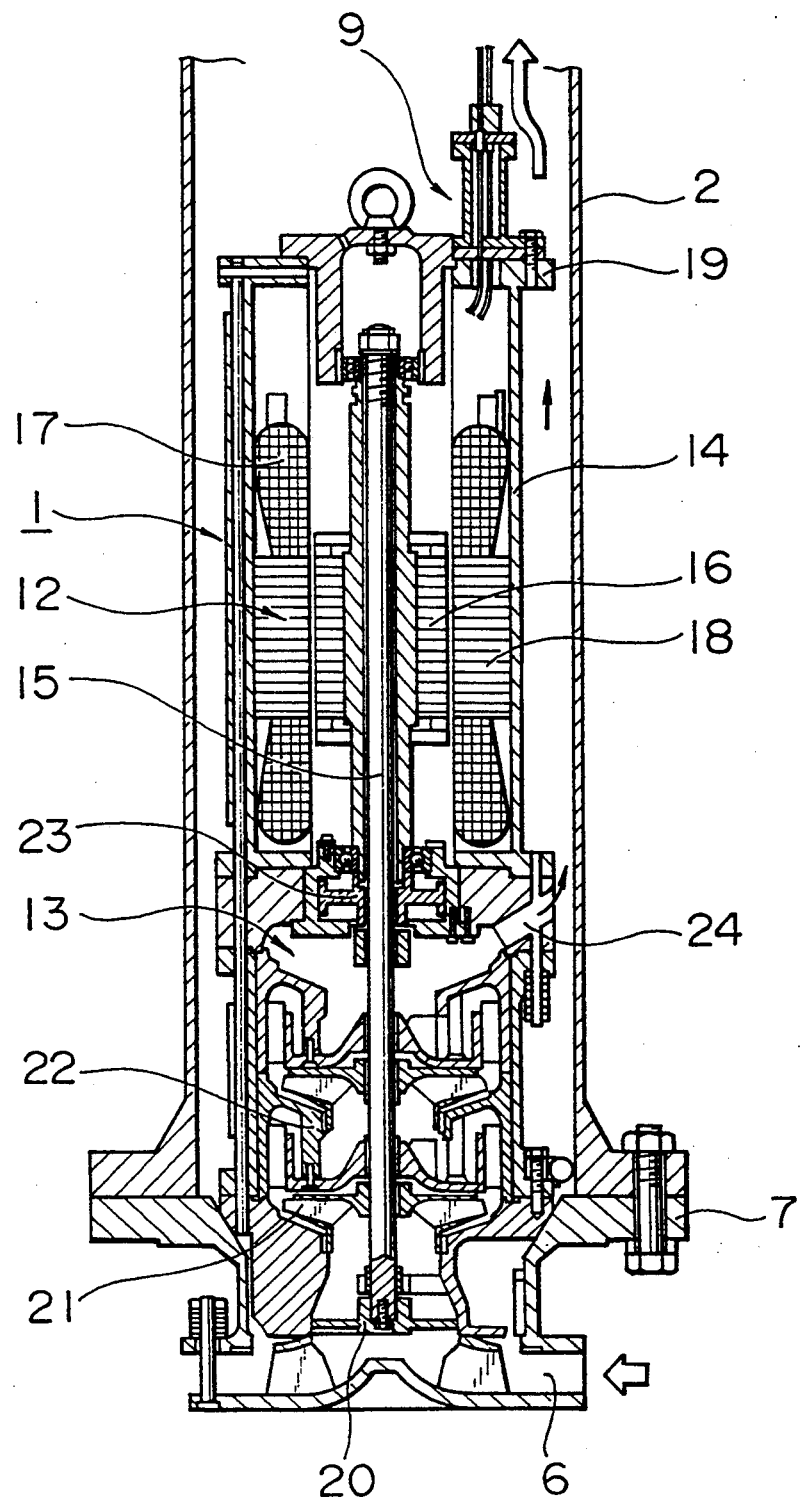
FIG. 1 is an axial sectional view of a canned motor pump employing the present invention.

When the canned motor pump 1 is electrically energized, the liquid in the tank is sucked through the clearance between the foot valve 6 and the foot valve adapter 7, as shown in FIG. 1, and flows in the column pipe 2 along a path indicated by arrows shown in FIG. 6 and is then discharged from the column pipe 2 through a discharge port 8 formed therein.

The canned motor pump 1 comprises a motor section 12 and a pump section 13, as shown in FIG. 1.

The motor section 12 includes a driving shaft 15 rotatably disposed in a casing 14 of the canned motor pump 1, a rotor 16 mounted on the driving shaft 15, a stator 18 having a stator coil 17 disposed around the rotor 16, a terminal base 19 provided at the top end of the casing 14 and having a through-hole open to the interior of the casing 14, and the afore-mentioned terminal structure 9 mounted on the terminal base 19.

The pump section 13 includes an inducer 20 connected to the bottom end of the driving shaft 15, an impeller 21 disposed above the inducer 20 and mounted on the driving shaft 15 for rotation therewith, a diffuser 22 disposed above the impeller 21, a balancing mechanism 23 disposed adjacent the boundry between the motor and pump sections 12 and 13, and liquid discharge openings 24 (only one of which is shown) formed in the casing 14.

The terminal 9 will then be described with reference to FIG. 2.

The terminal 9 is of a generally tubular and double seal structure. More specifically, the terminal 9 comprises a hollow tubular member 25 of a corrosion-resistant metal such as a stainless steel, a power source-side sealing section 27 provided at one end of the tubular member 25 and a motor-side sealing section 28 provided at the other end of the tubular member 25. The sealing section 27 utilizes gaskets 26A and 26B, while the sealing section 28 is of a metallic sealing structure.

Figure 2:
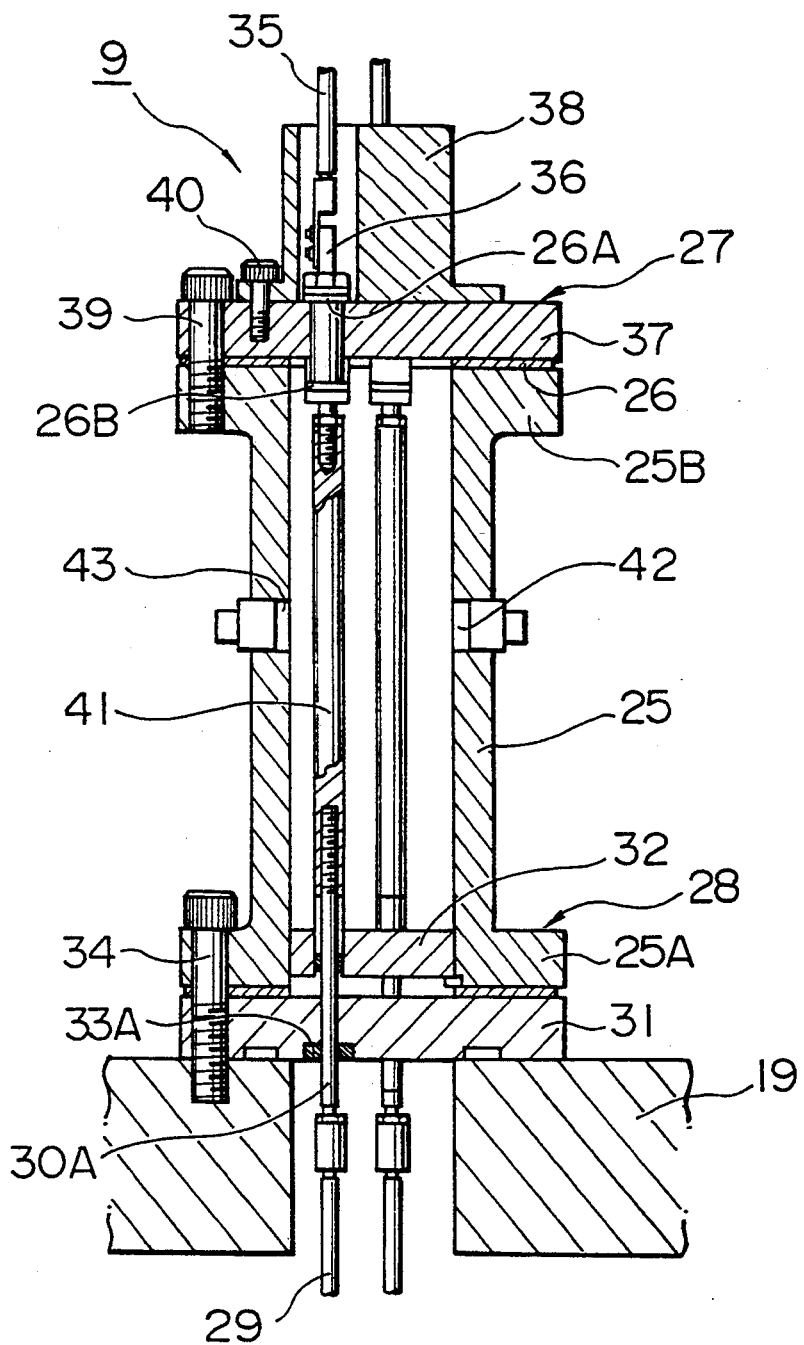
FIG. 2 is an enlarged longitudinal sectional view of a terminal structure of the canned motor pump shown in FIG. 1.
Figure 3:
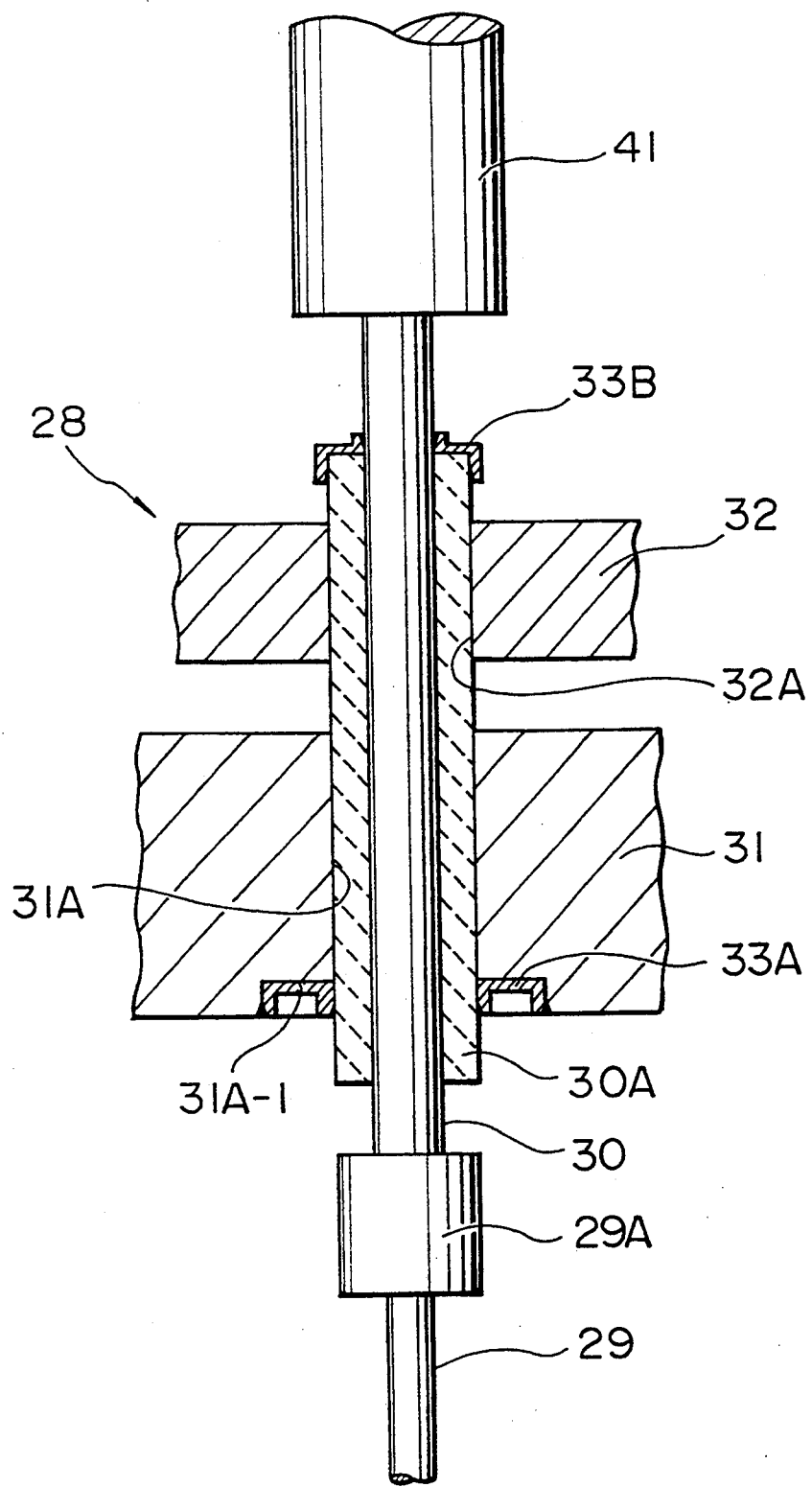
FIG. 3 is an enlarged fragmentary longitudinal sectional view of the terminal structure, illustrating how a motor-side terminal of the terminal structure is connected to a housing of the terminal structure.

As will be seen in FIGS. 2 and 3, the motor-side sealing section 28 comprises a terminal element 30 of a metal such as copper, a sleeve member 30A of an electrically insulating ceramic material such as a ceramic material, a lower terminal plate 31 of a corrosion-resistant metal such as a stainless steel, a lower flange 25a of a corrosion-resistant metal such as a stainless steel, a spacer 32, and a pair of metallic sealing rings 33A and 33B.

The copper terminal element 30 is connected by an electrical connector 29A to an end of the motor-side conductor cable 29 the other end of which is connected to the afore-mentioned stator 18 of the motor. The lower terminal plate 31 is placed on the terminal base 19 and has a through-hole 31A through which the ceramic sleeve member 30A extends and is held by the terminal plate 31. The copper terminal element 30 extends through the ceramic sleeve member 30A. An annular recess 31A-1 of a diameter greater than that of the through-hole 31A is formed along the inner peripheral edge of the opening of the through-hole 31A in that face of the lower terminal plate 31 which is directed toward the terminal base 19. The recess 31A-1 receives an annular metallic sealing ring 33A having a substantially "U" shape as viewed in its axial section. The metallic sealing ring 33A is connected to the lower terminal plate 31 by welding and to the ceramic sleeve member 30A by soldering, whereby the lower terminal plate 31 and the ceramic sleeve member 30A are completely sealingly connected together.

The lower flange 25A is formed at the bottom end of the tubular member 25 and integral therewith, as shown in FIG. 2. The flange 25A is disposed on the upper surface of the lower terminal plate 31 with a gasket interposed therebetween and is secured to the lower terminal plate 31 by bolts 34 only one of which is shown in FIG. 2. The afore-mentioned spacer 32 is disposed radially inwardly of the lower flange 25A to close the bottom end portion of the inner space of the tubular member 25. The spacer 32 also has formed therein a through-hole 32A through which the ceramic sleeve member 30A extends.

In other words, the ceramic sleeve member 30A extends through the through-hole 31A in the lower terminal plate 31 and through the through-hole 32A in the spacer 32, whereby the ceramic sleeve member 30A is firmly fixed.

From the upper end portion of the ceramics sleeve member 30A which upwardly extends from the through-hole 32A in the spacer 32, the upper end of the copper terminal element 30 extends upwardly and is connected to a rod-like conductor 41. The top end of the ceramics sleeve member 30A which projects upwardly from the through-hole 32A is covered with a metallic sealing ring 33B of a generally cup-shaped axial section. The sealing ring 33B has a central opening through which the copper terminal element 30 extends. The sealing ring 33B is connected to the ceramic sleeve member 30A by soldering and to the copper terminal element 30 by soldering, whereby the ceramic sleeve member 30A and the copper terminal element 30 are completely sealingly connected together.

Figure 4:
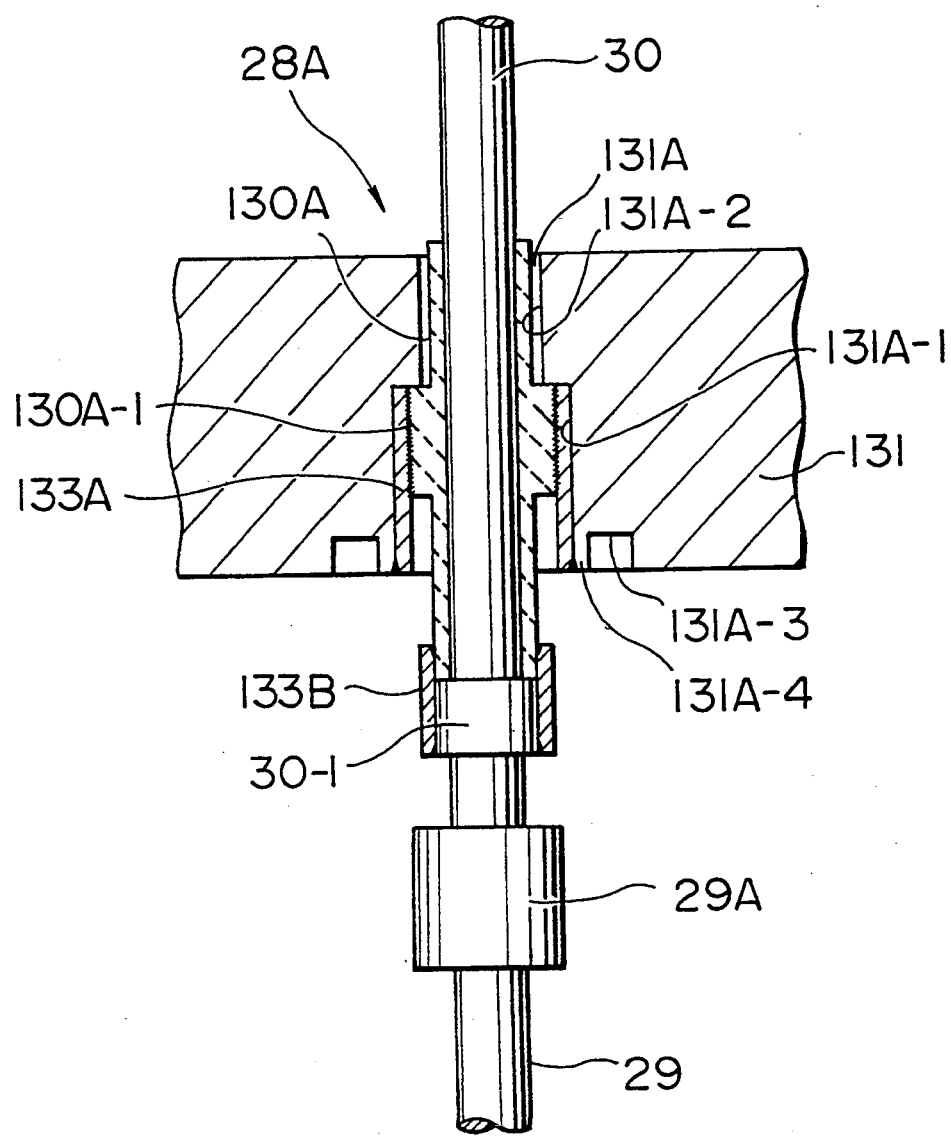
FIG. 4 is an enlarged fragmentary longitudinal sectional view of a modified terminal structure, illustrating a modified connection of the motor-side terminal to the housing of the terminal structure.

FIG. 4 shows a modification of the motor-side sealing section 28.

The modified motor-side sealing section 28A shown in FIG. 4 comprises a lower terminal plate 131 of a corrosion-resistant metal such as steel having a through-hole 131A, a sleeve member 130A of an electrically insulating material such as ceramic material extending through the through-hole 131A, a copper terminal element 30 extending through the ceramic sleeve member 130A, a first metallic sealing ring 133A sealingly connecting the lower terminal plate 131 to the ceramic sleeve member 130A, and a second metallic sealing ring 133B sealingly connecting the copper terminal element 30 to the ceramic sleeve member 130A. The first and second metallic sealing rings 133A and 133B are both made of a Ni—Co—Fe based alloy.

As shown in FIG. 4, the through-hole 131A formed in the lower terminal plate 131 comprises a cylindrical recess 131A-1 open in the surface of the terminal plate 131 directed to the casing 19, and a cylindrical through-hole 131A-2 formed in the bottom of the cylindrical recess 131A-1 and open in the surface of the terminal plate 131 remote from the casing 19. The cylindrical recess 131A-1 and the through-hole 131A-2 are formed in a coaxial relationship. An annular recess 131A-3 is also formed in the surface of the terminal plate 131 adjacent the casing 19 and arranged coaxially with the cylindrical recess 131A-1. The annular recess 131A-3 has an inner diameter greater than the outer diameter of the cylindrical recess 131A-1, so that the two recesses 131A-1 and 131-3 are radially spaced a distance by an annular projection 131A-4 which is a part of and integral with the terminal plate 131.

Adjacent the end of the copper terminal element 30 adjacent the motor-side cable 29 is formed an annular projection 30-1 of a diameter greater than that of the copper terminal element 30. The copper terminal element 30 is connected to the motor-side conductor cable 29 by means of an electrical connector 29A.

The ceramic sleeve member 130A is provided with an outer periphery 130A-1 of a diameter greater than the outer diameters of any other portions of the ceramic sleeve member 130A.

The copper terminal element 30 is inserted into and extends through the ceramic sleeve member 130A. The outer peripheral surface of the peripheral portion 130A-1 of the ceramic sleeve member 130A is fixedly and sealingly connected by soldering to the inner peripheral surface of the first metallic sealing ring 133A to form a seal assembly which is inserted into the through-hole 131A until the upper shoulder of the large-diameter outer periphery 130A-1 is engaged by the bottom of the cylindrical recess 131A-1 in the lower terminal plate 131. The inner diameter of the cylindrical recess 131A-1 is so determined as to snugly receive the seal assembly formed by the ceramic sleeve member 130A and the first metallic sealing ring 133A.

The first metallic sealing ring 133A has an axial length which is equal to the distance from the bottom of the cylindrical recess 131A-1 to the surface of the lower terminal plate 131 adjacent the casing 19. Thus, when the seal assembly is correctly inserted into the cylindrical recess 131A-1, the axially outer end face of the first cylindrical metallic sealing ring 133A is flush with the annular end face of the annular projection 131A-4 on the lower terminal plate 131. The axially outer end of the first metallic sealing ring 133A and the annular projection 131A-4 are sealingly connected together by welding.

As described above, the ceramic sleeve member 130A and the first metallic sealing ring 133A are sealingly connected together by soldering and the first metallic sealing ring 133A and the lower terminal plate 131 are sealingly connected together by welding, whereby the ceramic sleeve member 130A, the first metallic sealing ring 133A and the lower terminal plate 131 are completely sealingly connected together.

On the other hand, the bottom end of the ceramic sleeve member 130A, through which the terminal element 30 extends, is disposed in abutment with an upper shoulder of the annular projection 30-1 on the terminal element 30. The second cylindrical metallic sealing ring 133B is disposed such that the junction between the annular projection 30-1 and the bottom end of the ceramic sleeve member 130A is covered with the second metallic sealing ring 133B. The second metallic sealing ring 133B is sealingly connected to the annular projection 30-1 by soldering and to the ceramic sleeve member 130A by soldering, whereby the ceramic sleeve member 130A and the copper terminal element 30 are completely sealingly connected together.

Figure 5:
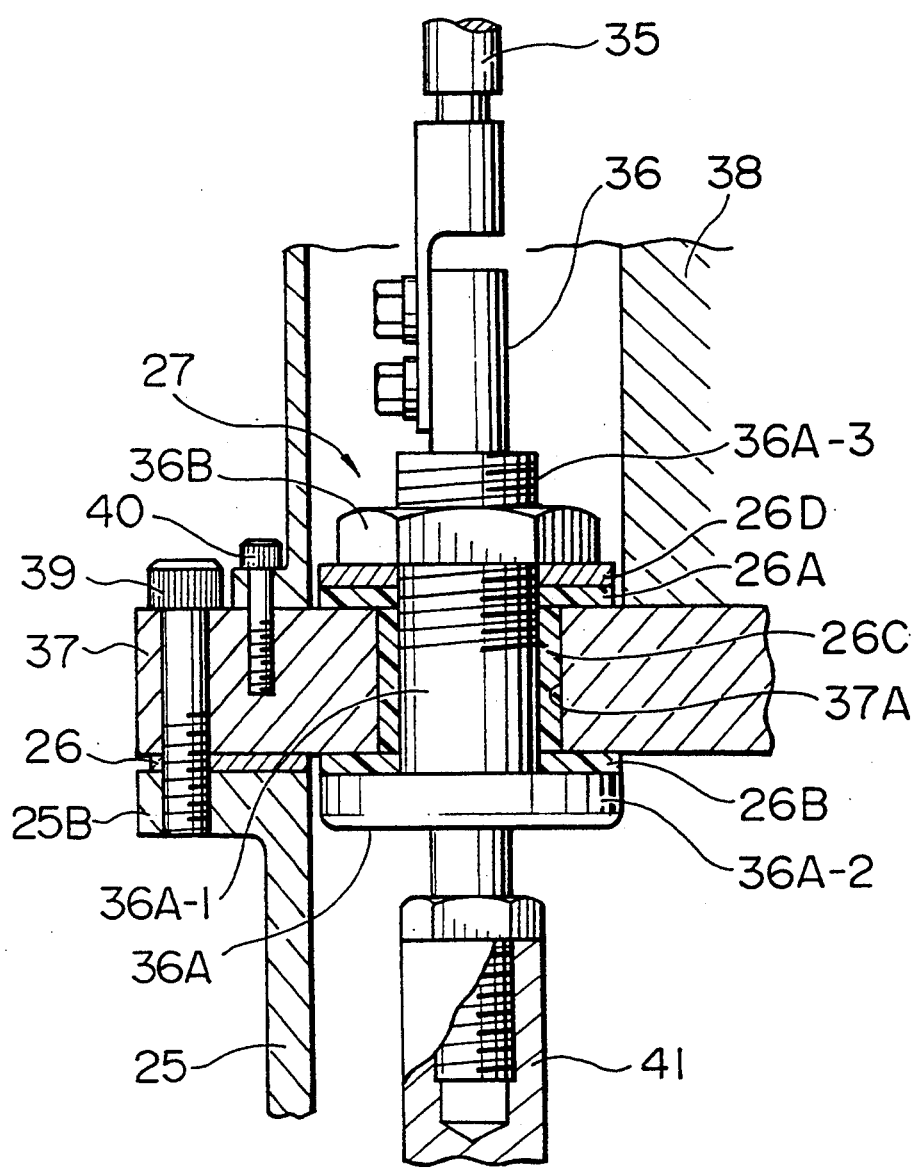
FIG. 5 is an enlarged fragmentary longitudinal sectional view of the terminal structure shown in FIG. 2, illustrating how a power source-side terminal is connected to the housing of the terminal structure.

The power source-side sealing section 27 is best shown in FIGS. 2 and 5. This sealing section 27 comprises a terminal element 36 of a metal, such as a stainless steel, which is corrosion-resistant to corrosive liquids such as liquefied ammonia or the like, a connector assembly formed by a socket 36A and a nut 36B, first and second gaskets 26A and 26B both made of an electrically insulating material such as Teflon (trade name), and a sleeve member 26C of an electrically insulating material such as Teflon (trade name).

The socket 36A comprises a hollow tubular shank 36A-1 having an integral flange 36A-2 at one end and screw threads 36A-3 formed in the outer peripheral surface of the other end portion of the shank 36A-1.

The first and second gaskets are both of annular plates having inner diameters substantially the same as the outer diameter of the shank 36A-1 of the socket 36A. The Teflon sleeve member 26C has an inner diameter substantially the same as the outer diameter of the shank 36A-1 of the socket 36A and an outer diameter substantially the same as the inner diameter of a through-hole 37A formed in an upper terminal plate 37.

The stainless terminal member 36 is inserted into and extends through the socket 36A. The second gasket 26B is fitted over the shank 36A-1 and disposed on the flange 36A-2 and. The sleeve member 26C is then disposed around the shank 36A-1 to form a socket and gasket assembly which is then inserted into the through-hole 37A in the upper terminal plate 37 until the upper part of the shank 36A-1 projects upwardly from the upper surface of the upper terminal plate 37 and the the second gasket 26B is brought into intimate contact with the bottom surface of the upper terminal plate 37. Thereafter, the first gasket 26A and a washer 26D are placed around the upwardly projecting part of the shank 36A-1. Then, the nut 36B is threadably engaged with the threaded outer peripheral surface of the upwardly projecting part of the shank 36A-1 of the socket 36A and is tightened to urge the first and second gaskets 26A and 26B into intimate sealing engagement with top and bottom surfaces of the upper terminal plate 37 and the top and bottom ends of the plastic sleeve member 26C, whereby the through-hole 37A in the upper terminal plate 37 is sealingly closed.

The upper terminal plate 37 is mounted on the upper end of the tubular member 25 with a gasket 26 interposed therebetween and secured by bolts 39 (only one of which is shown) to an upper flange 25B formed on the upper end of the tubular member 25. The upper terminal member 36 is protected by a cover member 38 mounted on the upper terminal plate 37 by bolts (only one of which is shown).

The lower terminal element 30 of copper and the upper terminal element 36 of stainless steel are threadably connected to the opposite ends of the conductor 41 disposed in the tubular member 25.

Preferably, the tubular member 25 shown in FIG. 2 is provided with a gas inlet 42 formed in the peripheral wall of the tubular member 25. The gas inlet 25 can be connected with a gas supply pipe (not shown) having a pressure gauge (not shown) provided thereon so that an inert gas such as nitrogen gas can be introduced under pressure into the space in the hollow tubular member 25. In place of the inert gas, a filling material such as silicone rubber may alternatively be introduced through the gas inlet 42 into the tubular member. In other words, the inner space of the tubular member 25 can be charged with any one of the inert gasses and the filling material which can positively discharge water or humid air from the space in the tubular member 25.

The tubular member 25 is further provided with a gas outlet 43 which is formed in the peripheral wall of the tubular member and can be connected with a valve (not shown) so that the nitrogen gas introduced into the tubular member 25 can be discharged from the tubular member 25.

The merit of the canned motor pump 1 and, more specifically, the merit of the terminal structure 9 will be described hereunder.

Because the terminal structure 9 of the canned motor pump 1 comprises a housing formed mainly by the lower terminal plate 31 of a corrosion-resistant metal such as stainless steel, the upper terminal plate 37 of a corrosion-resistant metal such as stainless steel and a tubular member 25 of a corrosion-resistant metal such as stainless steel, the housing is not corroded by the corrosive liquid, such as liquefied ammonia, flowing through the column pipe 2 even if the component parts of the housing are contacted by the liquid.

In addition, because the power source-side sealing section 27 is of a sealed structure which employs the gaskets 26A and 26B and the motor-side sealing section 28 is of a sealed structure which utilizes the ceramic sleeve member 30A or 130A and metallic sealing rings 33A and 33B or 133A and 133B, these sealing elements provide highly reliable sealing performances and are operative to seal the terminal structure against leakage of the corrosive liquid.

Moreover, in the case where a nitrogen gas purge is effected wherein nitrogen gas is introduced into the tubular member 25 through the gas inlet 42 formed in the peripheral wall of the tubular member 25, the nitrogen gas purge can advantageously prevent the occurrence of an electrical leak caused due to condensation of water which occurs when air is contained in the tubular member 25. The nitrogen gas introduced into the tubular member 25 may advantageously be kept at a pressure higher than the inner pressure of the column pipe, thereby to prevent leakage of the liquid at the power source-side sealing section 27.

In summary, the terminal structure of the present invention is of the above-described double seal structure which is operative to eliminate leakage of corrosive liquid. In addition, an electrically insulating gas or insulating material may be employed to eliminate substantial leakage of the liquid to the terminal structure. Accordingly, the present invention provides a highly reliable terminal structure for a motor-driven pump.

Finally, it is noted that the present invention is not limited to the preferred embodiments described above and may have various modifications within the scope of the invention defined in the claims attached hereto.

What is claimed is:

1. A terminal structure adapted to be provided on a casing of a motor-driven pump to be disposed in a storage tank for a corrosive liquid such as liquefied ammonia, said terminal structure designed to interconnect a conductor cable for supplying electric power to a motor of said motor-driven pump with an electric power supply cable for receiving electric power from an electric power source, said terminal structure comprising a housing including
a lower base disposed of said housing,
a hollow tubular member having a first open end and a second open end,
said first open end hermetically closed by said lower base,
an upper closure member hermetically closing said second open end of said tubular member,
a gas inlet formed in a peripheral wall of said hollow tubular member;
said housing made of an anticorrosive material suitable for connection by welding;
a motor-side terminal element having first and second ends;
said first end of said motor-side terminal element adapted to be electrically connected to the conductor cable and extending through a through-hole in said lower base and connected to said lower base hermetically by molten metallic sealing and in an electrically insulated manner;
an aluminium power source-side terminal element having first and second ends;
first end of said aluminium power source-side terminal element adapted to be electrically connected to an end of the electric power supply cable which end is remote from the power source;
said power source-side terminal element extending through a second through-hole in said upper closure member and connected to said upper closure member through gaskets and in a hermetic and electrically insulated manner;
a conductor member disposed in said housing and electrically interconnecting said second end of said motorside terminal element and said second end of said aluminium power source-side terminal element;
means for supplying an inert gas into said housing through said gas inlet;
wherein space in said housing is filled with said inert gas with the gas pressure higher than an inner pressure of the storage tank.

2. The terminal structure in accordance with claim 1, wherein
an electrically insulating sleeve member is fitted into said through-hole in said lower base and hermetically connected thereto by a first metallic sealing means and said motor-side terminal element extends through said sleeve member and is hermetically sealed thereto by a second metallic sealing means.

3. The terminal structure in accordance with claim 2, wherein
said first and second metallic sealing means comprise first and second metallic sealing rings both made of an Ni—Co—Fe alloy;
said first metallic sealing ring is sealingly connected to said lower base by welding and to said sleeve member by soldering;
said second metallic sealing ring is sealingly connected to said sleeve member by soldering and to said motor-side terminal element by welding.

4. The terminal structure in accordance with claim 1, wherein
said inert gas is one of nitrogen gas or a rare gas.

5. A motor-driven pump for use in a storage tank for holding a liquid capable of corroding copper, comprising
an electric motor having a rotor and a stator;
a pump disposed in axially aligned relation to said motor and having an impeller connected to said rotor;
a casing accommodating said motor and said pump, and having a first substantially closed end adjacent to said motor and a second open end adjacent to said impeller;
foot valve means for opening and closing said second open end of said casing;
a first through-hole formed in said first closed end;
an electric power supply line extending through said first through-hole, a first end of the electric power supply line being electrically connected to a coil of said stator;
said electric power supply line including
a conductor cable, a first end of which is electrically connected to said coil,
and terminal means for electrically connecting a second end of said conductor cable and an electric power supply cable,
said terminal means including a first terminal element having first and second ends, said first end of said terminal element connected to said second end of said conductor cable, a conductor member having first and second ends, said first end of said conductor member electrically connected to said second end of said first terminal element, a second terminal element having first and second ends, said first end of said second terminal element electrically connected to said second end of said conductor member, said second end of said second terminal element electrically connected to said electric power supply cable;

terminal housing means for sealingly protecting substantial parts of said terminal means against the liquid, said terminal housing means made of an anti-corrosive material and suitable for welding;

said terminal housing means comprising a hollow tubular member having first and second end walls substantially closing opposite ends of said hollow tubular member, and a gas inlet formed in a peripheral of said hollow tubular member, said hollow tubular member accommodating said conductor member, said terminal housing means being mounted on said first end of said casing with said first end wall of said hollow tubular member being based on said casing first end having said first through-hole, second and third through-holes formed in said first and second end walls respectively, said second and third through-holes being substantially aligned with said first through-hole in the longitudinal direction of said tubular member;

said first terminal element being made of a conductive material suitable for welding and extending through said second through-hole;

said second terminal element being made of aluminium and extending through said third through-hole;

first sealing means for sealingly connecting said first terminal element to said first end wall of said tubular member;

said first sealing means including a sleeve member of an electrically insulating material through which said first terminal member extends, said sleeve member extending through said second through-hole, a first metallic sealing ring disposed between and hermetically connected to said sleeve member by soldering and to said first end wall of said tubular member by welding, and a second metallic sealing ring disposed between and hermetically connected to said first terminal element by welding and to said sleeve member by soldering;

second sealing means for sealingly connecting said second terminal element to said second end wall of said tubular member;

said second sealing means including a socket having a hollow shank and an integral flange at a first end thereof, said second terminal element extending through said socket, said socket being disposed such that said shank extends through said third through-hole with said flange disposed adjacent to an inner surface of said second end wall of said tubular member, at least one gasket member of an electrically insulating elastic material disposed between said socket and said second end wall of said tubular member, and a nut disposed adjacent to an outer surface of said second end wall of said tubular member and threadably engaged with said shank of said socket;

and means for supplying an inert gas into said terminal housing means through said gas inlet wherein a space in said terminal housing means is filled with the inert gas whose pressure is higher than an inner pressure of the storage tank.

6. A motor-driven pump in accordance with claim 5 wherein said tubular member is made of stainless steel.

* * * * *